United States Patent Office 2,804,377
Patented Aug. 27, 1957

2,804,377
PREPARATION OF PURE SILICON

Carl Marcus Olson, Newark, Del., assignor to E. I. du Pont de Nemours and Company, Wilmington, Del., a corporation of Delaware No Drawing. Application June 25, 1954,
Serial No. 439,449

10 Claims. (Cl. 23—223.5)

This invention is related to the preparation of elemental, hyperpure silicon, and more particularly to novel methods for removing trace impurities from elemental zinc metal useful as a reductant for silicon halides in the vapor phase process for preparation of such pure silicon.

As is already known, silicon can be prepared in a relatively pure state by the vapor phase reduction of redistilled silicon tetrachloride with commercial grade pure zinc. The silicon product will, however, contain traces of metal contaminants and up to as much as .03% of carbon. For the most sensitive electronic uses, silicon of higher purity is required because the presence of even trace amounts of impurities proves detrimental for the most exacting semiconductor requirements, especially in the newer electronics applications, such as transistors.

While zinc is available commercially in grades of relatively high purity such as for example, 99.99% zinc and more recently 99.999% zinc, neither of these products is sufficiently free of trace impurities for production of silicon of the quality and uniformity required for those exacting applications such as transistors and the like.

Among the objects of this invention is an improved process for the production of hyperpure elemental silicon by the vapor phase reduction of pure silicon halide with elemental metal reductant vapor. A further object is a process for the production of hyperpure elemental silicon of improved electrical semiconductor quality. Another object is an improved process for the purification of elemental zinc. Further objects will be apparent in the ensuing description.

The objects of this invention are accomplished in an improved process for producing elemental silicon which comprises removing trace impurities from commercial reductant metal of high purity selected from the group consisting of zinc and cadmium by passing the metal reductant as a vapor into contact with a scavenging bed of elemental silicon of high purity, combining the vaporous metal reductant subsequent to its contact with the bed of elemental silicon with vaporous silicon halide of high purity while the vaporous mixture of the reactants are confined in a reaction chamber maintained at a temperature in excess of the dew point of the metal reductant and its halide reaction product, continuing the admixing of the two reactants within the reaction chamber where the desired silicon product is deposited while exiting the halide of the metal reductant bearing gases therefrom and recovering the elemental silicon product after discontinuing the addition of the reactants and cooling of the apparatus.

More specifically the objects of this invention are accomplished by passing elemental zinc vapor of high purity through a bed of elemental silicon particles of high purity, maintaining said bed at a temperature above the boiling point of elemental zinc, passing a heated stream of the purified elemental zinc vapor emerging therefrom and a heated stream of silicon tetrachloride vapor of hyperpurity into a reduction reactor, maintaining the reduction reaction zone temperature above the boiling point of elemental zinc reductant and below the melting point of elemental silicon product, removing the by-products and unreacted reactants therefrom in the vapor state, and recovering hyperpure elemental silicon product deposited therein.

Still more specifically the objects of this invention are accomplished by passing a stream of elemental zinc vapor of high purity and containing trace amounts of contaminating elements over a scavenging bed of elemental silicon particles of high purity, maintaining said bed at a temperature within the range of 907–1100° C., maintaining said zinc vapor in contact with said bed for a period of about .1 to 10 seconds, depositing contaminating impurities thereon, passing a heated stream of said purified elemental zinc vapor and a heated stream of hyperpure silicon tetrachloride simultaneously and continuously into a vapor phase reduction reactor, mixing said streams of reactants immediately upon introduction therein, maintaining a slight stoichiometric excess of silicon tetrachloride therein, maintaining said reduction reaction zone temperature within the range of about 907–1100° C., removing the by-product zinc chloride and unreacted reactants in the vapor phase, discontinuing the feeding of zinc vapor to the reactor prior to lowering the temperature of said reactor, holding the reactor at reaction temperature in the presence of silicon chloride vapor, cooling the reaction system in the presence of an inert gas, and removing the hyperpure elemental silicon deposited therein.

A practical adaptation of the process can be described in reference to a preferred embodiment of the invention. Silicon tetrachloride of the purest commercially available quality is used as a starting material. This grade of silicon tetrachloride is normally produced by the chlorination of electro-furnace silicon. While this silicon tetrachloride is distillation purified, it never-the-less contains traces of such contaminating matter as chloro- and oxychloro-compounds of carbon, boron, iron, copper, aluminum, tin, titanium, chromium, nickel, vanadium, phosphorous, and other elements and oxychloro-compounds of silicon. Repurification of the silicon tetrachloride is preferably performed by newly developed methods for the removal of contaminating traces of compounds such as noted above. Preferably, these purification steps comprise passing a heated stream of commercial distillation-purified silicon tetrachloride vapor over or through a pyrolysing bed of fused silica rings maintained at a temperature of about 1000° C., using a flow rate such that the silicon tetrachloride vapor is retained over said pyrolysing bed for a period of about 2–3 seconds. The vapor emerging from the bed is then condensed and about one mole of water per 100 moles of silicon tetrachloride is added to said silicon tetrachloride. After allowing the water treated silicon tetrachloride to stand for several hours the mixture is subjected to distillation, thereby separating the contaminating compounds formed by pyrolysis and hydrolysis, or otherwise made nonvolatile by the foregoing treatment. The silicon tetrachloride so purified is free of chloro-compounds of carbon, boron, copper, titanium, and aluminum, as well as oxychloro-compounds of these and other elements including silicon, as determinable by infra-red spectroscopy methods, and other specialized analytical techniques. Said purified silicon tetrachloride is vaporized in a continuous stream by dropping onto fused silica chips maintained at a temperature in the range of about 600–700° C. in a fused silica flask connecting into an associated vapor phase reaction system fabricated entirely of fused silica, and comprising a preheating coil, scavenging bed, and a vapor phase reduction reactor, and associated vaporizer and scavenging bed for elemental zinc. The scavenging beds for the silicon tetrachloride and for the zinc vapor are each made up of loosely packed particles of very pure elemental silicon in crystalline form and screened to approximately 2–16 mesh size. The scavenging bed for the silicon tetrachloride is maintained by external heating at a temperature preferably within in the range of 850–925° C., while the scavenging bed for the zinc vapor is maintained by external heating at a temperature within the range of about 907–100° C. The amount of scavenging silicon used in each case is variable depending on the length of service required from a given bed. Sufficient bed is provided to give a unitary retention of silicon tetrachloride over its scavenging bed of about one second. Preferably sufficient bed is provided to give an average retention time of elemental zinc vapor over the silicon bed of about .5 to 5 seconds, although from about .1 to 10 seconds retention may be used. Thus, said vaporized silicon tetrachloride is passed through the preheating coil into the scavenging bed of silicon. The stream of hyperpure silicon tetrachloride leaving the scavenger is passed directly into the reduction reactor. Simultaneously, elemental zinc vapor of high purity is vaporized and passed into its scavenging bed of high purity silicon particles, and directly therefrom into said vapor phase reduction reactor. The two heated streams of hyperpure reactants are immediately mixed upon entrance into said reactor maintaining a slight stoichiometric excess of silicon tetrachloride therein, and maintaining the reduction reaction zone at a temperature of about 950° C. by external heating means. Upon filling the reaction zone almost completely with silicon product, largely in the form of loosely held together granular crystalline elemental silicon, the zinc vapor feed to the reactor is discontinued and after allowing the silicon tetrachloride vapor to pass through the reactor while still at reaction temperature for about an hour, the flow of silicon tetrachloride is stopped, and the reactor cooled. During cooling, argon is continually fed in a low rate to prevent entrance of air. During the reaction the by-products including zinc chloride and unreacted reactants are removed from the reaction space as vapor and the hyperpure silicon deposited therein is removed after cooling. The product yield, based on the silicon tetrachloride fed into the system, is usually about 50%.

To a clearer understanding of the invention, the following specific examples are given. These are merely illustrative and not to be taken as in limitation of the invention.

*Example 1*

Commercially pure silicon tetrachloride that had been purified by distillation was used as a starting raw material. This type of silicon tetrachloride usually contained minor amounts of such impurities as a chlorocompounds of carbon, boron, iron, copper, aluminum, tin, titanium, chromium, nickel, vanadium, phosphorous, and other elements, and oxychloro and complex chlorocompounds of silicon, carbon, and other elements. Removal of the carbon, copper, titanium, boron, and aluminum containing contaminants was performed by passing a heated stream of the silicon tetrachloride vapor over a pyrolysing bed of fused silica rings maintained at a temperature of about 100° C., using a flow rate such that the silicon tetrachloride vapor retention over said pyrolysing bed was about 2–3 seconds. The vapor emerging from said pyrolysing bed was condensed in a silica flask, all equipment being fabricated of fused silica, solidly connected together with welded joints. About one mole of water per 100 moles of silicon tetrachloride was added to said condensed silicon tetrachloride and the mixture allowed to stand at room temperature for two days. Said mixture was then subjected to distillation, the distillate being highly purified silicon tetrachloride, particularly with respect to elimination of carbon, boron, copper, titanium and aluminum containing contaminants. At a rate of about 33 cubic centimeters per minute, this highly purified silicon tetrachloride was continuously revaporized in a flash vaporizer consisting of a closed silica flask partly filled with silica chips and maintained at a temperature of about 600–700° C., the silicon tetrachloride vapor passing from said vaporizer through associated silica tubing into a preheating zone and thereafter into a bed of pure silicon particles loosely packed in a cylindrically shaped tower fabricated of fused silica and connected to the vaporizer and preheater by silica tubing with welded joints. The exit line from the scavenging tower was also directly connected by means of silica tubing to the reduction reactor, also fabricated of fused silica and of all-welded construction. The scavenging bed was maintained at a temperature within the range of about 850–925° C., and was composed of about five pounds of crystalline elemental silicon. This elemental silicon was of high purity and made by vapor phase reduction of a commercial grade of silicon tetrachloride with a pure grade of zinc. This silicon was melted, and cast into ingot forms, then crushed to about 2–4 mesh. The heated silicon tetrachloride was passed through this bed without undue back pressure being developed. The unitary vapor retention time over the bed of scavenging silicon was about one second. The silicon particles became darker in color due to the coating of adsorbed impurities removed from the silicon tetrachloride. The stream of silicon tetrachloride emerging from the scavenging bed was passed directly into the vapor phase reduction reactor. Concurrent with the revaporization of the repurified silicon tetrachloride into the silicon scavenging bed, elemental zinc of about 99.999% purity was vaporized from a silica flask fitted with an inert gas purged intermittant feed mechanism for the zinc. The zinc was vaporized at a rate of about 34 grams per minute, passing through direct connected all-welded silica tubing into a bed of crystalline silicon composed of about five pounds of the crystalline aggregates prepared as noted above for the silicon tetrachloride scavenging bed. The bed of silicon was maintained at a temperature of about 950° C., by external heating and the unitary retention time of the zinc vapor over the bed was about one second. The emerging streams from the two scavenging beds were directly and simultaneously passed into the vapor phase reduction reactor through direct connected all-welded silica tubing, entering the reactor in parallel and closely adjacent streams, at the entrance end plate of said reactor. The reactor consisted of a horizontally positioned fused silica cylinder about 8 inches in diameter and about 6 feet long, and externally heated, being maintained at about 950° C. A slight stoichiometric excess of silicon tetrachloride over zinc was continuously maintained in the reactor during the reaction. The hyperpure crystals of elemental silicon were continuously deposited within the reactor, building a loosely held together structure of crystals, starting at the entrance end, and gradually filling the reaction space, until reaching the outlet end, after about 40 hours of operation. During this period the zinc chloride vapor produced as a by-product and the unreacted silicon tetrachloride vapor and zinc vapor were being passed from the reactor into associated condensing and recovery equipment. Upon filling the reaction space with product crystals of silicon, the flow of zinc reactant was discontinued, and after an hour the flow of silicon tetrachloride was discontinued and the reactor cooled in the presence of nitrogen to allow recovery of the product therefrom. Based on the silicon tetrachloride fed to the vaporizer through the silicon scavenging bed, a product yield of about 50% was obtained. The product was removed from the reactor by scraping with a zinc carried scraper and screened through a 14 mesh plastic screen. The product retained on the screen was satisfactory for manufacture of high quality transistors.

Example II

High purity commercial zinc was vaporized at about 100 grams per minute in an all-silica apparatus, the vapor effluent passing through a tubular silica preheater where the temperature was raised to about 1000° C. The effluent zinc vapor from the heater was passed through a bed of very high purity silicon particles of about 10 mesh size, made by pelletizing fine crystallites. The amount of silicon was such that from 4 to 5 seconds average retention time of the zinc vapor over the bed of silicon was attained. The vapor effluent from the scavenging bed of silicon was condensed and found to be zinc of extremely high purity.

Example III

High purity elemental zinc was purified by scavenging in the vapor form over a heated bed of silicon as described in Example II. Said purified zinc vapor was heated to about 950° C. and at the same time commercially purified silicon tetrachloride was vaporized and heated to about 950° C. Streams of the heated reactants were simultaneously passed into a vapor phase reduction reactor and reacted as described in Example I, the silicon tetrachloride being in slight stoichiometric excess. The vapor phase reactor was maintained at about 950° C. throughout the period of continuous operation until the reaction zone became almost filled with loosely held together coarse crystals of very high purity elemental silicon, while the by-product zinc chloride and the unreacted reactants were being removed as vapor. The high purity silicon crystals produced were of improved transistor quality compared to those produced with the same silicon tetrachloride and with the same commercial high purity zinc without removing the trace impurities by first subjecting it to the high temperature silicon scavenging.

The mechanism by which the scavenging bed of silicon removes the trace contaminants from the zinc vapor is not completely understood. It is postulated that the heated silicon adsorbs these materials from the heated zinc vapor being passed through the bed and reduces entrainment of any condensed phases. Whether or not the contaminating compounds are chemically reduced to silicides is not known. It has been observed, however, that the surface of the silicon particles used in the bed becomes coated with a dark colored film. By passing the highly purified zinc directly from the scavenging chamber into the reactor without exposure to air or other contamination as a reductant for the decomposition of silicon tetrachloride, no further chance for recontamination is allowed.

The silicon used as the scavenger for the zinc (or cadmium) vapor is much higher in purity than any commercially available electro-furnace grade of silicon. The primary particle size of the crystals used is not known to be critical, as long as the particles are of sufficient size to form a loosely packed bed through which the elemental zinc vapor may be passed without undue flow resistance. Thus large aggregated crystals may be broken down to the desired size by mild grinding or fine powder like crystallites may be compacted or pelletized to the desired size. While a particle size of from 2 to 16 mesh is convenient, smaller or larger sizes of particles are utilizable. Pure silicon which has been melted to form an ingot and crushed to the desired size, may be preferred.

The contact time i. e. the average retention time of the elemental zinc vapor over the heated scavenging bed of silicon is dependent upon the types and amounts of contaminating compounds in zinc, the type of silicon aggregate, and the temperature at which the scavenging bed is maintained. Sufficient contact time is provided to allow for the scavenging or adsorption reactions to take place so as to obtain complete purification of the zinc vapor. Usually about .5 to 5 seconds at the temperature indicated is preferred, however from about .1 to 10 seconds and higher can be utilized.

The temperature of the scavenging bed of silicon over which the zinc vapor is passed is maintained by external heating means at a temperature above the boiling point of the elemental zinc. While a temperature within the range of from 907–1000° C. is preferred, temperatures up to the melting point of elemental silicon can be effectively utilized. The zinc vapor entering the scavenging zone is preferably preheated to a temperature close to that at which the scavenging zone is maintained during operation.

The pressure under which the zinc vapor is maintained in the scavenging bed system is not known to be critical. While pressures very close to atmospheric have been found to be satisfactory, higher or lower pressures can be used, if desired. The pressures of the interconnected and interrelated silicon tetrachloride system and reactor system are of course kept in balance with the zinc purification system.

The temperature of the reduction reaction zone is maintained by external heating means above the condensation temperature of the elemental zinc or cadmium reductant and its halide reaction product but below the melting point of the elemental silicon being produced. Preferably this temperature should be within the temperature range of 907–1100° C. The silicon halide and metal vapor reactants entering the reduction reaction zone are preferably preheated to a temperature close to the temperature at which the reduction reaction zone is being maintained during operation.

While the rate of flow of silicon halide to the reaction zone is based on the stoichiometric relationship of silicon halide to zinc, a slight excess, in the order of 5 to 10% by weight excess of silicon halide vapor being preferred, a stoichiometric excess of silicon halide over zinc of up to 50% by weight or a deficiency of silicon halide amounting to 50% by weight can be used if desired. The flow of silicon halide is preferably maintained through the reduction reaction zone after the cessation of the flow of zinc therethrough, while maintaining this zone at reaction temperature and after this zone is sufficiently filled with product.

The invention is applicable to the silicon halides, generally including silicon tetrachloride, di-silicon hexachloride, silicon tetrabromide, di-silicon tetrabromide, silcon tetraiodide and the like. Silicon tetrachloride is preferred for obvious commercial reasons. Likewise, zinc is preferred over cadmium because of its commercial availability.

If desired, an inert carrier gas, such as hydrogen, nitrogen or argon or other gas selected from the Eighth Group of the Periodic Table can be used to assist in conveying the silicon halide vapor or vaporized zinc through one or all of reaction zones, and to control reaction conditions.

The removal of the product silicon from the reaction chamber may be done on a semi-continuous basis by means of an alternating reaction chamber arrangement. However, continuous maintenance of constant reaction conditions by continuous addition of reactant silicon tetrachloride and zinc to the zonal reactor over the entire reaction period, until the main reduction reaction zone becomes almost completely filled with deposited product silicon, followed, by cooling in the presence of an inert gas such as nitrogen or other gas selected from the Eighth Group of the Periodic Table and removal of the deposited product at a temperature less than about 200° C., is a convenient method of operation.

The pyrolysing bed of silica, when used in the purification of the silicon halide reagent, is maintained by external heating means at a temperature above 600° C. However, optimum results are obtained at a temperature above that to which the silicon tetrahalide is subjected in the reduction reaction zone. Preferably, and for complete conversion of the contaminating compounds to species removable from silicon tetrachloride, temperatures within the range of 975–1200° C. are used. The silicon tetrachloride or halide entering the pyrolysing bed is preferably preheated to a temperature close to that at which the pyrolysing zone is maintained during operation.

The addition of water to the silicon tetrachloride in the purification of this reactant is preferably done after passing the silicon tetrachloride vapor over the pyrolysing bed of silica particles or rings maintained at a high temperature. However, this step can be effectively performed before passing the silicon tetrachloride over said pyrolyzing bed if desired. The amount of water added to the silicon tetrachloride is usually a minor amount, within the range of .01 to 10 mole percent based on the silicon tetrachloride, although about one mole percent is preferred. The water can be added dropwise as a liquid, or as ice, over an extended period, with agitation or can be added by passing a water saturated inert gas, as for example, argon or nitrogen, through the liquid silicon tetrachloride. The separation of the hydrolyzed, hydrated, and otherwise water-complexed contaminants can be made immediately after the addition of water, or can be delayed for several hours or several days. The thus purified silicon tetrachloride is eminently suited for use with the purified zinc described above in the production of highest quality silicon for the electronics industry.

Among the advantages of this process, it is noteworthy that the novel process of the invention provides not only a superior quality silicon for use in transistors and other electronic semiconductor equipment, but also provides a novel method of obtaining elemental zinc of hyperpurity. Such extremely high purity elemental zinc can be used, as for example, for the production of many inorganic and organic zinc compounds of hyperpurity in its vaporous state or subsequent to its condensation. Furthermore, the zinc vapor purified by passage over a scavenging bed of elemental silicon can be used for the vapor phase reduction of other volatile halides to produce the elemental material in very pure form.

I claim as my invention:

1. An improved process for the manufacture of hyperpure elemental silicon from a commercial metal reactant of high purity selected from the group consisting of zinc and cadmium and a halide of silicon of high purity which comprises removing trace impurities from the commercial metal reactant by passing the metal as a vapor into contact with a scavenging bed of elemental silicon of high purity, combining the vaporous metal reactant subsequent to its contact with the bed of elemental silicon with the vaporous silicon halide reactant while the vaporous mixture of the reactants are confined in a reaction chamber maintained at a temperature in excess of the dew point of the metal reactant and its halide reaction product but below the melting point of the silicon being deposited in the reaction chamber, continuing the admixing of the two reactants within the reaction chamber where the elemental silicon product is deposited while exiting metal halide bearing gases therefrom and recovering said elemental silicon product after discontinuing the addition of the reactants and cooling the reaction chamber.

2. An improved process for the manufacture of hyperpure elemental silicon from commercial zinc of high purity and a halide of silicon of high purity which comprises removing trace impurities from the commercial zinc reactant by passing the zinc as a vapor into contact with a scavenging bed of elemental silicon of high purity, combining the vaporous zinc subsequent to its contact with the bed of elemental silicon with the vaporous silicon halide reactant while the vaporous mixture of the reactants are confined in a rection chamber maintained at a temperature in excess of the dew point of the zinc but below the melting point of the silicon being deposited in the reaction chamber, continuing the admixing of the two reactants within the reaction chamber where the elemental silicon product is deposited while exiting zinc halide bearing gases therefrom and recovering said elemental silicon product after discontinuing the addition of the reactants and cooling the reaction chamber.

3. An improved process for the manufacture of hyperpure elemental silicon from commercial zinc of high purity and a silicon tetrachloride of high purity which comprises removing trace impurities from the commercial zinc reactant by passing the zinc as a vapor into contact with a scavenging bed of elemental silicon of high purity, combining the vaporous zinc subsequent to its contact with the bed of elemental silicon with the vaporous silicon chloride reactant while the vaporous mixture of the reactants are confined in a reaction chamber maintained at a temperature in excess of the dew point of the zinc but below the melting point of the silicon being deposited in the reaction chamber, continuing the admixing of the two reactants within the reaction chamber where the elemental silicon product is deposited while exiting zinc chloride bearing gases therefrom and recovering said elemental silicon product after discontinuing the addition of the reactants and cooling the reaction chamber.

4. An improved process for the manufacture of hyperpure elemental silicon from silicon tetrahalide of high purity and commercial zinc of high purity which comprises first removing trace impurities from the zinc by passing the latter as a vaporous stream into contact with a scavenging bed of elemental silicon of high purity contained in a silica chamber, combining the vaporous zinc subsequent to its contact with the bed of elemental silicon with the vaporous silicon tetrahalide reactant while the vaporous mixture of the reactants is also confined within silica apparatus maintained at a temperature in excess of the boiling point of zinc but below the melting point of the silicon being deposited in the reaction chamber, continuing the admixing of the two reactants within the said silica apparatus where the elemental silicon product is deposited while exiting zinc halide bearing gases therefrom, and recovering said elemental silicon product after the reagent addition has been discontinued and the silica apparatus cooled.

5. An improved process for the manufacture of hyperpure elemental silicon from silicon tetrahalide of high purity and commercial zinc of high purity which comprises first removing trace impurities from the zinc by passing the latter as a vaporous stream into contact with a scavenging bed of elemental silicon of high purity contained in a silica chamber, combining the vaporous zinc subsequent to its contact with the bed of elemental silicon with the vaporous silicon tetrahalide reactant while the vaporous mixture of the reactants is also confined within silica apparatus maintained at a temperature within the range of 907° C. and 1100° C., continuing the admixing of the two reactants within the said silica apparatus where the elemental silicon product is deposited while exiting zinc halide bearing gases therefrom, and recovering said elemental silicon product after the reagent addition has been discontinued and the silica apparatus cooled.

6. An improved process for the manufacture of hyperpure elemental silicon from silicon tetrachloride of high purity and commercial zinc of high purity which comprises first removing trace impurities from the zinc by passing the latter as a vaporous stream into contact with a scavenging bed of elemental silicon of high purity contained in a silica chamber, combining the vaporous zinc subsequent to its contact with the bed of elemental silicon with the vaporous silicon tetrachloride reactant while the vaporous mixture of the reactants is also confined within silica apparatus maintained at a temperature in excess of the boiling point of zinc but below the melting point of the silicon being deposited in the reaction chamber, continuing the admixing of the two reactants within the said silica apparatus where the elemental silicon product is deposited while exiting zinc chloride bearing gases therefrom and recovering said elemental silicon product after the reagent addition has been discontinued and the silica apparatus cooled.

7. An improved process for the manufacture of hyperpure elemental silicon from silicon tetrachloride of high purity and commercial zinc of high purity which comprises first removing trace impurities from the zinc by passing the latter as a vaporous stream into contact with a scavenging bed of elemental silicon of high purity contained in a silica chamber, combining the vaporous zinc subsequent to its contact with the bed of elemental silicon with the vaporous silicon tetrachloride reactant while the vaporous mixture of the reactants is also confined within silica apparatus maintained at a temperature within the range of 907° C. and 1100° C., continuing the admixing of the two reactants within the said silica apparatus where the elemental silicon product is deposited while exiting zinc chloride bearing gases therefrom, and recovering said elemental silicon product after the reagent addition has been discontinued and the silica apparatus cooled.

8. An improved process for the manufacture of hyperpure elemental silicon from silicon tetrabromide of high purity and commercial zinc of high purity which comprises first removing trace impurities from the zinc by passing the latter as a vaporous stream into contact with a scavenging bed of elemental silicon of high purity contained in a silica chamber, combining the vaporous zinc subsequent to its contact with the bed of elemental silicon with the vaporous silicon tetrabromide reactant while the vaporous mixture of the reactants is also confined within silica apparatus maintained at a temperature within the range of 907° C. and 1100° C., continuing the admixing of the two reactants within the said silica apparatus where the elemental silicon product is deposited while exiting zinc bromide bearing gases therefrom, and recovering said elemental silicon product after the reagent addition has been discontinued and the silica apparatus cooled.

9. A process for the production of elemental zinc of high purity in vaporous form which comprises passing commercial zinc of high purity as a vaporous stream into contact with a scavenging bed of elemental silicon maintained at a temperature in excess of the boiling point of zinc within a silica chamber and recovering the purified vaporous stream therefrom.

10. A process for the production of an elemental metal of high purity in vaporous form selected from the group consisting of zinc and cadmium which comprises passing the metal of high purity as a vaporous stream into contact with a scavenging bed of elemental silicon maintained at a temperature in excess of the boiling point of said metal and recovering the purified vaporous stream therefrom.

References Cited in the file of this patent

UNITED STATES PATENTS

| 1,241,796 | Weaver | Oct. 2, 1917 |
| 2,594,370 | Warburton | Apr. 29, 1952 |

FOREIGN PATENTS

| 627,904 | Great Britain | Aug. 18, 1949 |
| 656,098 | Great Britain | Aug. 15, 1951 |

OTHER REFERENCES

Lyon et al.: "J. of Electrochemical Society," vol. 96, No. 6, December 1949, pages 359–363.

UNITED STATES PATENT OFFICE

CERTIFICATE OF CORRECTION

August 27, 1957

Patent No. 2,804,377

Carl Marcus Olson

It is hereby certified that error appears in the printed specification of the above numbered patent requiring correction and that the said Letters Patent should read as corrected below.

Column 3, line 8, for "907-100° C." read --907-1000° C.--; line 62, for "about 100° C." read --about 1000° C.--; column 6, line 65, after "followed" strike out the comma.

Signed and sealed this 5th day of November 1957.

(SEAL)
Attest:
KARL H. AXLINE

Attesting Officer

ROBERT C. WATSON
Commissioner of Patents